(12) United States Patent
McCain et al.

(10) Patent No.: US 11,944,905 B2
(45) Date of Patent: Apr. 2, 2024

(54) METHOD TO REGULATE JUMPS AND FALLS BY PLAYABLE CHARACTERS IN XR SPACES

(71) Applicants: Sony Group Corporation, Tokyo (JP); Sony Corporation of America, New York, NY (US)

(72) Inventors: Robert M. McCain, Chandler, AZ (US); Tsubasa Tsukahara, Los Angeles, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 192 days.

(21) Appl. No.: 17/488,251

(22) Filed: Sep. 28, 2021

(65) Prior Publication Data
US 2023/0096913 A1   Mar. 30, 2023

(51) Int. Cl.
*A63F 13/577*   (2014.01)
*A63F 13/58*   (2014.01)

(52) U.S. Cl.
CPC ............ *A63F 13/577* (2014.09); *A63F 13/58* (2014.09); *A63F 2300/643* (2013.01); *A63F 2300/65* (2013.01)

(58) Field of Classification Search
CPC ...... A63F 13/213; A63F 13/216; A63F 13/25; A63F 13/428; A63F 13/53; A63F 13/56; A63F 13/577; A63F 13/65; A63F 2300/643; A63F 2300/65; A63F 2300/69; A63F 2300/8082; A63F 2300/8094; G06T 19/00; G06T 19/006; G06T 2210/21; G06V 20/20
See application file for complete search history.

(56) References Cited

U.S. PATENT DOCUMENTS

| 10,255,302 B1 | 4/2019 | Cosic |
| 10,928,973 B2 | 2/2021 | Shuster |

(Continued)

FOREIGN PATENT DOCUMENTS

EP   3459071   3/2019

OTHER PUBLICATIONS

Siyuan Chen et al.: "Fast Path Searching in Real Time 3D Game", Intelligent Systems, 2009. GCIS '09. WRI Global Congress On, IEEE, Piscataway, NJ, USA, May 19, 2009 (May 19, 2009), pp. 189-194, XP031516049, ISBN: 978-0-7695-3571-5.

*Primary Examiner* — Lawrence S Galka
(74) *Attorney, Agent, or Firm* — Trellis IP Law Group, PC (57) ABSTRACT

A method for regulating falls of a user-controlled character through gaps between surfaces in an extended reality (XR) space in which the user is playing a game includes compiling a record from a previously generated spatial mapping mesh (SMM) of the XR space of surfaces of real elements present in that space, with corresponding positions and dimensions; and, after the game begins, determining whether, if the character approaches a substantially vertical gap between an edge of a first surface at a first level and a second surface, at a second level lower than the first level, continuing motion of the character to fall through the vertical gap will be permitted or prevented. A similar method for regulating jumps rather than falls of a user-controlled character through gaps between surfaces in an extended reality (XR) space in which the user is playing a game is also described.

17 Claims, 5 Drawing Sheets

(56) References Cited

U.S. PATENT DOCUMENTS

2009/0197686 A1    8/2009  Bergelt
2012/0197464 A1*   8/2012  Wang .................. G06F 3/04842
                                                        701/28
2021/0248826 A1    8/2021  Shriram

* cited by examiner

METHOD TO REGULATE JUMPS AND FALLS BY PLAYABLE CHARACTERS IN XR SPACES

CROSS REFERENCES TO RELATED APPLICATIONS

This application is related to the following applications: U.S. patent application Ser. No. 17/488,245, entitled "METHOD FOR PREDEFINING IN AN XR SPACE AN ENTRYWAY CORRESPONDING TO A REAL ENTRYWAY", filed on Sep. 28, 2021 (020699-118300US/SYP339929 US01 U.S. patent application Ser. No. 17/488,247, entitled "METHOD FOR PREDEFINING A VIRTUAL ENTRYWAY AT A VIRTUAL BOUNDARY OF AN XR SPACE", filed on Sep. 28, 2021 (020699-118400US/SYP340053US01); U.S. patent application Ser. No. 17/488,248, entitled "METHOD FOR PREDEFINING ACTIVITY ZONES IN AN EXTENDED REALITY (XR) ENVIRONMENT", filed on Sep. 28, 2021. (020699-118500S/SYP340054US01); U.S. patent application Ser. No. 17/488,249, entitled "METHOD TO USE RECOGNITION OF NEARBY PHYSICAL SURFACES TO GENERATE NPC REACTIONS To EVENTS", filed on Sep. 28, 2021 (020699-118600US/SYP340056US01);

U.S. patent application Ser. No. 17/488,250 entitled "METHOD FOR QUASI-RANDOM PLACEMENT OF VIRTUAL ITEMS IN AN EXTENDED REALITY (XR) SPACE", filed on Sep. 28, 2021 (020699-118700US/SYP340055US01

U.S. patent application Ser. No. 17/488,253, entitled. "METHODS FOR PREDEFINING VIRTUAL STAIRCASES CONNECTING PLATFORMS IN EXTENDED REALITY (XR) ENVIRONMENTS", filed on Sep. 28, 2021 (020699-118900US/SYP340058US01);

and U.S. patent application Ser. No. 17/488,254, entitled "METHOD TO IMPROVE USER UNDERSTANDING OF XR SPACES BASED IN PART ON MESH ANALYSIS OF PHYSICAL SURFACES", filed on Sep. 28, 2021 (020699-119000US/SYP340059US01);

each of which are hereby incorporated by reference as if set forth in full in this application for all purposes.

BACKGROUND

While virtual reality (VR) technologies aim to immerse a user in artificially generated or synthesized environments, inspired by real or imaginary environments, augmented reality (AR) technologies superimpose synthesized elements onto a real environment to which the user is exposed. The term mixed reality (MR) is used to refer to technologies that combine VR and AR, allowing a user to interact in real time with real and synthesized elements. More generally, the term extended reality or XR is used to encompass all three terms, although it is often (as in this disclosure) used interchangeably with MR.

Games, marketing and training are among the main applications for XR technology. This disclosure will focus on XR games, but it should be appreciated that there are many other applications for XR technology, including, for example, product marketing, and skills training, and the ideas discussed herein could be applied to any of these areas, without departing from the spirit or scope of the invention.

A primary goal of a game developer is to provide the user with as fully immersive an experience as possible, in which virtual characters (user-controlled or non-playable characters) can interact naturally with either real or synthesized (virtual) elements, and in which the virtual characters or objects behave "naturally" even though the real elements making up the physical environments in which the user may want to play—in different rooms in their home, or office, for example—will normally be completely unknown to the game developer, and may change over time, even for the same user, in the same building. In currently available XR applications, the goal of full immersion is far from being achieved.

Consider, first, VR games in which the environments have been fully defined by design, by the game developer, and contain only virtual items, such as virtual furniture and virtual structures like counters and walls. Many such games involve a user-controlled (playable) character moving, sometimes running fast, through the VR space, without being restricted to floor or ground level. On reaching an edge of one surface, facing a gap between that edge and the nearest edge of a second surface, the user may make the character jump across that gap, or even fall through the gap to reach the second surface if it is at a much lower level. As the game developer knows ahead of game play exactly where all the surfaces are positioned, and where the user-controlled character is going to be allowed to move, it is relatively simple to program into the game, in advance of it being played, exactly where jumps and falls are allowed, depending at least in part on the known relative heights and positions of surfaces, so that the character's jumps and falls will seem credible to the user. The game may use restrictions or rules that prevent the user from forcing the character to fall from the top of a virtual wardrobe to the virtual floor for example, or to jump from a virtual windowsill to a virtual tabletop 10 ft across the room. In this way, the user's immersion in the world of the game will hopefully be maintained.

However, in XR games, the physically real items of furniture and structural elements are not known during game development, so restrictions or rules that limit playable character positions and paths of movement may need to be made "on the fly", somehow taking into account in real time the specific situation that the user may have put their playable character into.

There is therefore a need for methods and systems that put limits on a user's freedom to direct a character's movements through an XR space during games, in such a way that the character is only permitted to jump or fall between particular pairs of real surfaces if separations between those surfaces are not unrealistically large.

It would of course be desirable for such methods and systems to leverage currently available hardware and software applications as appropriate, and to be computationally efficient, using minimal resources in time and computing power, to perform the necessary tracking of the character's movements and analysis of their relationship to the relative positions of nearby surfaces.

SUMMARY

Embodiments generally relate to methods and systems for regulating motion of a user-controlled character across gaps between real elements in an extended reality (XR) space in which the user is playing a game.

In one embodiment, a method for regulating falls of a user-controlled character through gaps between surfaces in an extended reality (XR) space in which the user is playing a game comprises: compiling a record from a previously generated spatial mapping mesh (SMM) of the XR space of surfaces of real elements present in that space, with corresponding positions and dimensions; and, after the game begins, determining whether, if the character approaches a substantially vertical gap between an edge of a first surface at a first level and a second surface, at a second level lower than the first level, continuing motion of the character to fall through the vertical gap will be permitted or prevented.

In another embodiment, a method for regulating jumps of a user-controlled character across gaps between surfaces in an extended reality (XR) space in which the user is playing a game comprises: compiling a record from a previously generated spatial mapping mesh (SMM) of the XR space of surfaces of real elements present in that space, with corresponding positions and dimensions; and, after the game begins, determining whether, if the character approaches a substantially horizontal gap between an edge of a first surface at a first level and a second surface, continuing motion of the character to jump across the horizontal gap will be permitted or prevented.

In yet another embodiment, a system for regulating falls of a user-controlled character through gaps between surfaces in an extended reality (XR) space in which the user is playing a game comprises: one or more processors; and logic encoded in one or more non-transitory media for execution by the one or more processors and when executed operable to: compile a record from a previously generated spatial mapping mesh (SMM) of the XR space of surfaces of real elements present in that space, with corresponding positions and dimensions; and, after the game begins, determine whether, if the character approaches a substantially vertical gap between an edge of a first surface at a first level and a second surface at a second level lower than the first level, continuing motion of the character to fall through the vertical gap will be permitted or prevented.

DETAILED DESCRIPTION OF EMBODIMENTS

A further understanding of the nature and the advantages of embodiments disclosed herein may be realized by reference of the remaining portions of the specification and the attached drawings.

Figure 1:
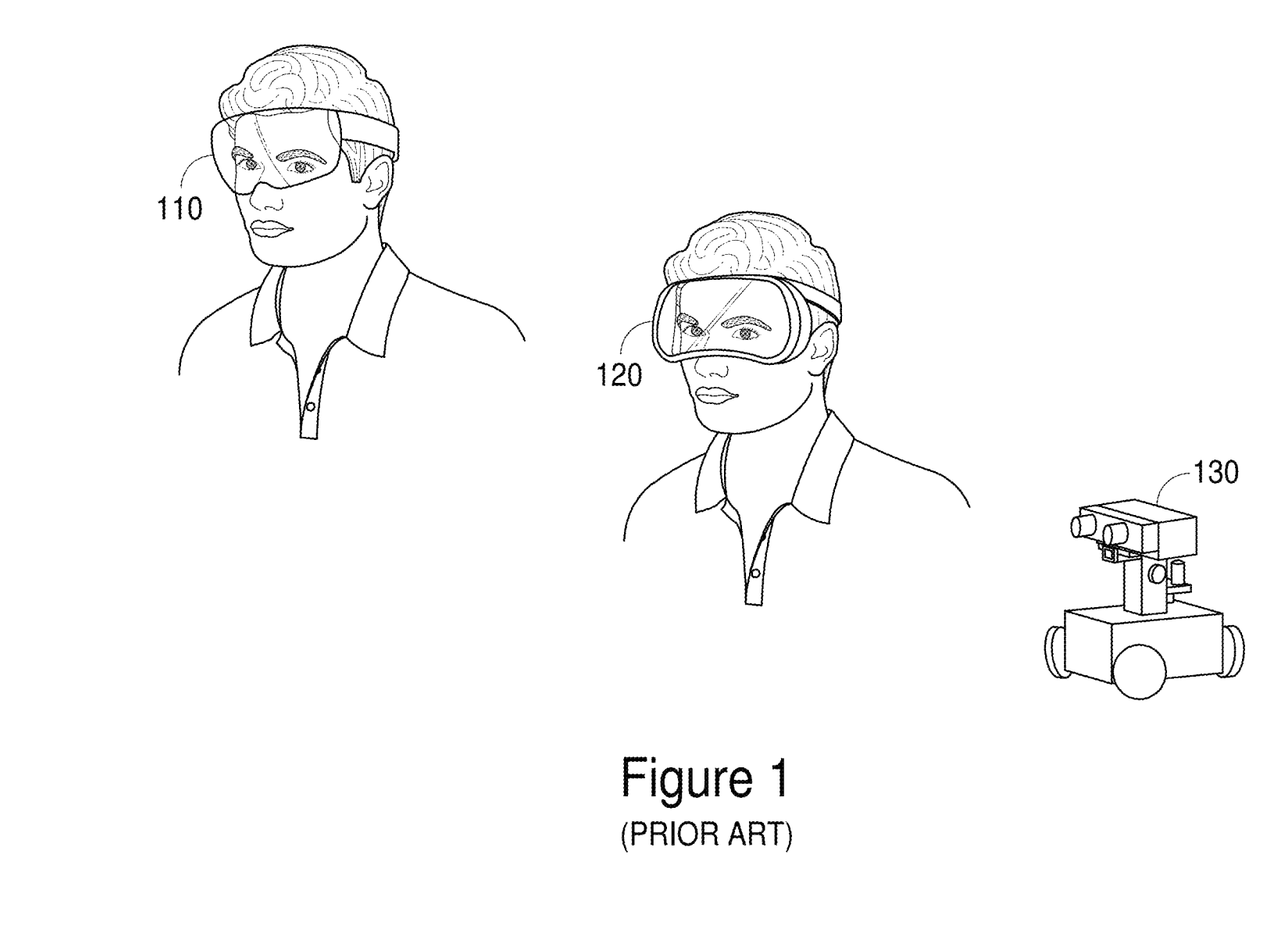
FIG. 1 (prior art) shows devices designed to generate mapping meshes that may be used in some embodiments.

Spatial mapping meshes (SMMs) may be generated by commercially available devices manufactured by gaming and other electronic companies. The devices may be head mounted, carried in the hand, or simply deployed (for example in the form of a robot) by a user to move autonomously around the space of interest, gathering data. Technologies such as e.g., LIDAR, ultrasound scanning, image analysis etc. for creating such meshes are well known and will not be discussed further herein. FIG. 1 shows two head mounted sensing and display devices, 110 and 120, and a robotic device 130, as examples of currently available devices by which SMMs can be generated. In some cases, the same devices used to generate the SMM is also used subsequently to display the resulting XR space, in which the user plays the game.

A typical SMM provided by such a device is a 3D representation, in the form of enormous numbers (tens or hundreds of thousands) of relatively small 2D polygons, of all visible and tangible surfaces in a given environment, such as within a house, in advance of the user commencing an XR game in a part of that environment, such as within one room of that house. By detecting and showing surfaces of all the physical elements actually present in the room of interest, open spaces between those elements may, of course, be inferred.

Figure 2:
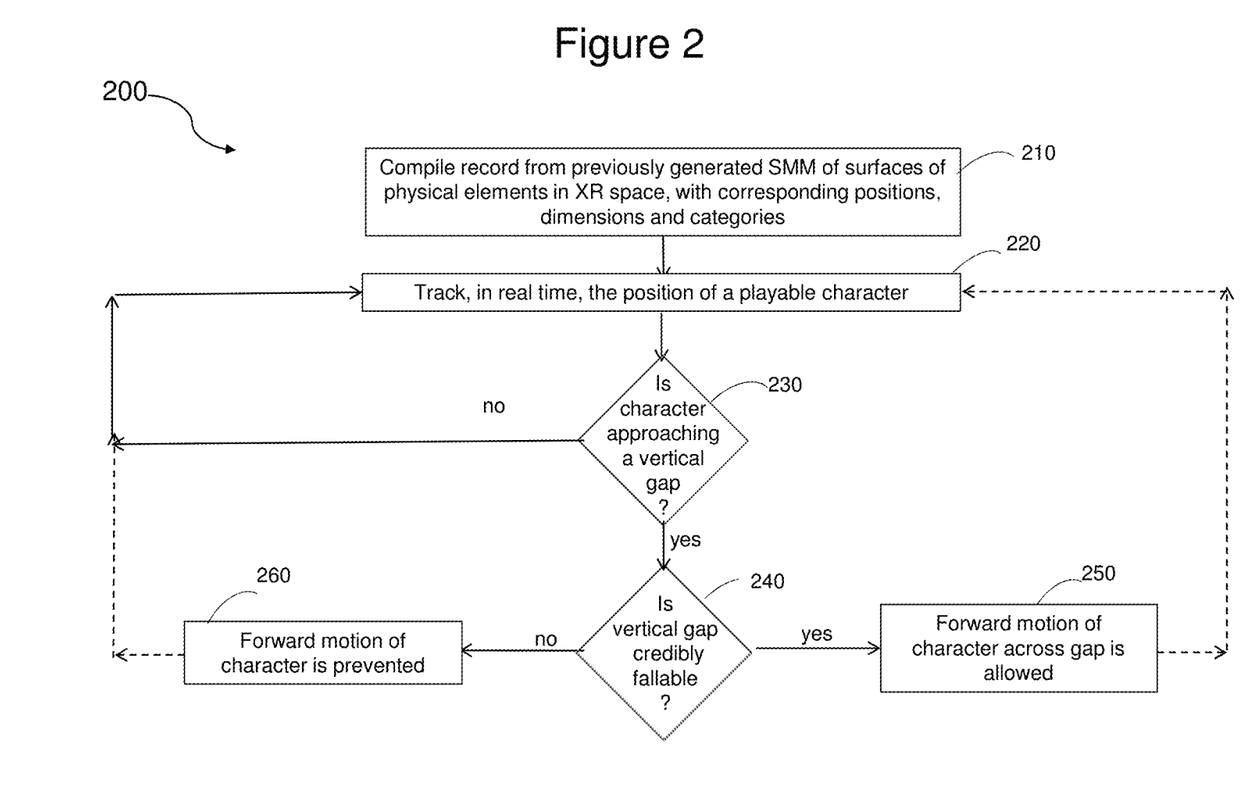
FIG. 2 is a flowchart of steps of a method to regulate motion of a user-controlled character approaching a vertical gap between real surfaces in an XR space, according to some embodiments.

FIG. 2 is a flowchart illustrating steps of a method 200 according to various embodiments of the present invention that address the problem of regulating falls in an XR environment to keep them believable, making use of an SMM mesh obtained as just discussed.

At step 210, a record is compiled from previously generated SMM of surfaces of physical elements in XR space, with corresponding positions, dimensions and categories. This happens before the game action begins, while steps 220-260 take place during the playing of the game.

At step 220, the position of a playable character is tracked in real time, by maintaining a virtual collider block at a particular position relative to the character and the real surface over which the character is currently moving.

At step 230, it is determined whether the character is approaching a substantially vertical gap between the real surface (the first surface) over which they are moving and a second real surface in front of them. "Substantially" should be understood in this context to mean that a simple fall from the first surface would put the character onto the second surface, without requiring much if any horizontal momentum. For example, it may mean that the angle of a line connecting the end points of the jump should be less than 20 degrees off the vertical.

A gap may be detected by performing a collision analysis involving the virtual collider block, by keeping the block a short fixed distance—one or two stride lengths of the character for example—in front of the character while positioned vertically such that some part of it is initially in contact with the first surface, keeping that vertical level constant as the character moves horizontally over that surface, and repeatedly checking whether or not the collider block is still making contact with the first surface. The details of how collision analyses may be implemented for surfaces of virtual blocks and real surfaces, using information in spatial mapping meshes, are well known to those of ordinary skill in the art, and will not be discussed further herein.

If at step 230 it is determined that the character is not approaching a gap, method flow loops back to tracking step 220 and repeats until a gap is detected. If and when it is determined that the character is approaching a gap, method flow passes to step 240, where an assessment is made as to whether the gap is credibly fallable. This assessment typically depends in part on characteristics of the playable character, such as their perceived height and/or shape. A gap of a given height may be "credibly fallable" for a tall spider-limbed character and not so for a short man. It is assumed herein that the game developer would have specified a particular maximum credible fall distance for the playable character of interest.

The assessment at step 240 may be achieved by (1) ensuring the virtual collider block has a height at least as great as the maximum credible fall distance, (2) maintaining the vertical position of the block such that its bottom surface is positioned at a distance below the level of the first surface equal to the maximum credible fall distance, and (3) performing a collision analysis to check whether any part of the block is in contact with the second surface. If it is, the vertical gap may be considered credibly fallable, so method control passes to step 250, at which the character is permitted to move forwards if so driven by the user, to encounter the edge, and fall.

If the collision analysis shows that no part of the virtual collider is in contact with the second surface, the gap is considered to be too large to be credibly fallable, and method control passes to step 260, where the character is prevented from moving forward. In some cases, the character may make some sort of gesture at this point, like throwing their arms up, or shaking a fist, or something else relevant to the game, making it clear to the user that forward progress has been blocked.

Figure 3:
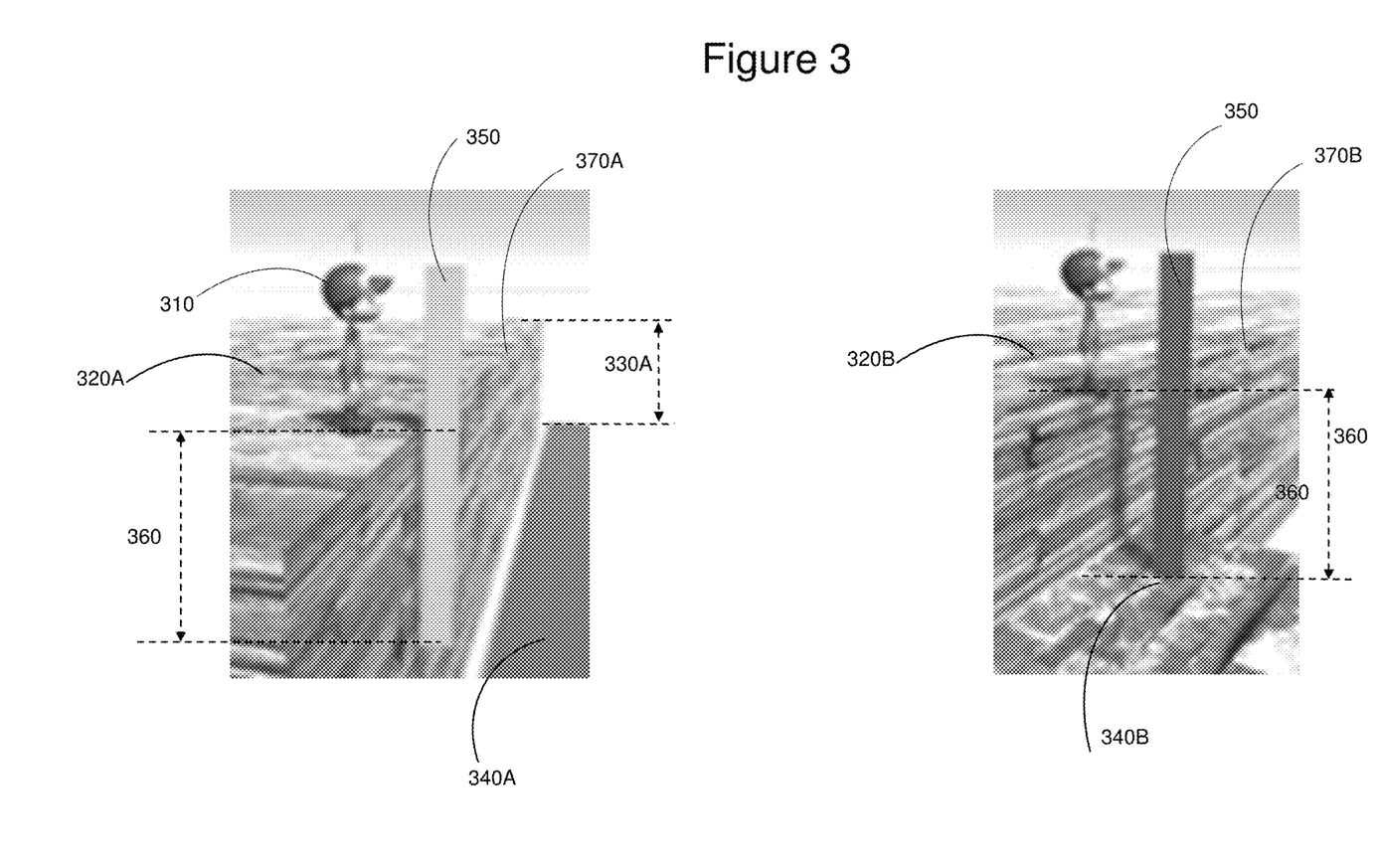
FIG. 3 illustrates two XR game scenarios, in which a user-controlled character is seen approaching a vertical gap, and a decision must be made on whether to allow the character to continue forwards to then fall, according to some embodiments.

FIG. 3 illustrates a perspective view of two XR game scenarios, in which a playable character is seen approaching a vertical gap, and a decision must be made on whether to allow the character to continue forwards to then fall, according to some embodiments.

In the left hand scenario in the figure, playable character 310 is walking across surface 320A towards a vertical gap 330A between 320A and a lower surface 340A. The character is preceded by virtual collider block 350, which is not visible to the user. A part of the block happens to project above the plane of surface 320A, but the significant portion is the rest of the block, extending below the plane of surface 320A, for a distance 360, the maximum credible fall height for character 310. At the instant pictured, block 350 has moved just past edge 370A of surface 320A, and the bottom surface of the block lies above the level of surface 340A. The collision analyses discussed above would therefore show that the block is not in contact with either surface 320A or surface 340A. This would be interpreted as meaning that gap 330A is too large to be credibly fallable for character 310A, so the answer generated to the question at step 240 of method 200 would be "no" and therefore further movement of the character 310A towards the edge would be prevented. Although gap 330A may appear at first sight as being smaller than the maximum credible fall height 360, FIG. 3 is a perspective view, and the gap would in actuality be larger than the maximum credible fall height in this case.

In the right hand scenario in the figure, the same playable character 310 is walking across surface 320B towards a vertical gap (not labeled) between 320B and a lower surface 340B. The character is preceded by virtual collider block 350, which again is not visible to the user. Just as before, part of the block happens to project above the plane of surface 320B, while the significant portion, the rest of the block, extends below the plane of surface 330B, for a distance 350, which is, as before, the maximum credible fall height for character 310. The big difference in this second scenario is that the bottom surface of block 350 now is seen to reach surface 340B. The collision analyses discussed above would therefore show that the block is not in contact with surface 320B (having moved just beyond the edge 370B) but is in contact with surface 340B. These findings would be interpreted as meaning that gap 330A is small enough to be credibly fallable for character 310, so the answer generated to the question at step 240 of method 200 would be "yes" and therefore further movement of the character 310A towards the edge would be allowed.

It should be noted that the right hand scenario depicts an extreme case of allowability, where the magnitude of the vertical gap exactly matches the threshold of being credibly fallable; if the gap were even slightly bigger, the block would lose contact with surface 340B, the step 240 answer would be "no" and forward movement of the character would be prevented, as in the left hand scenario discussed above. In most other cases of allowability, the virtual collider block might extend downwards to reach some level lower than the level of the second surface, meaning the magnitude of the gap would be smaller than the maximum credible fall distance, so of course the character would be permitted to move forwards closer to edge 370B and fall through the clearly "allowable" vertical gap.

Figure 4:
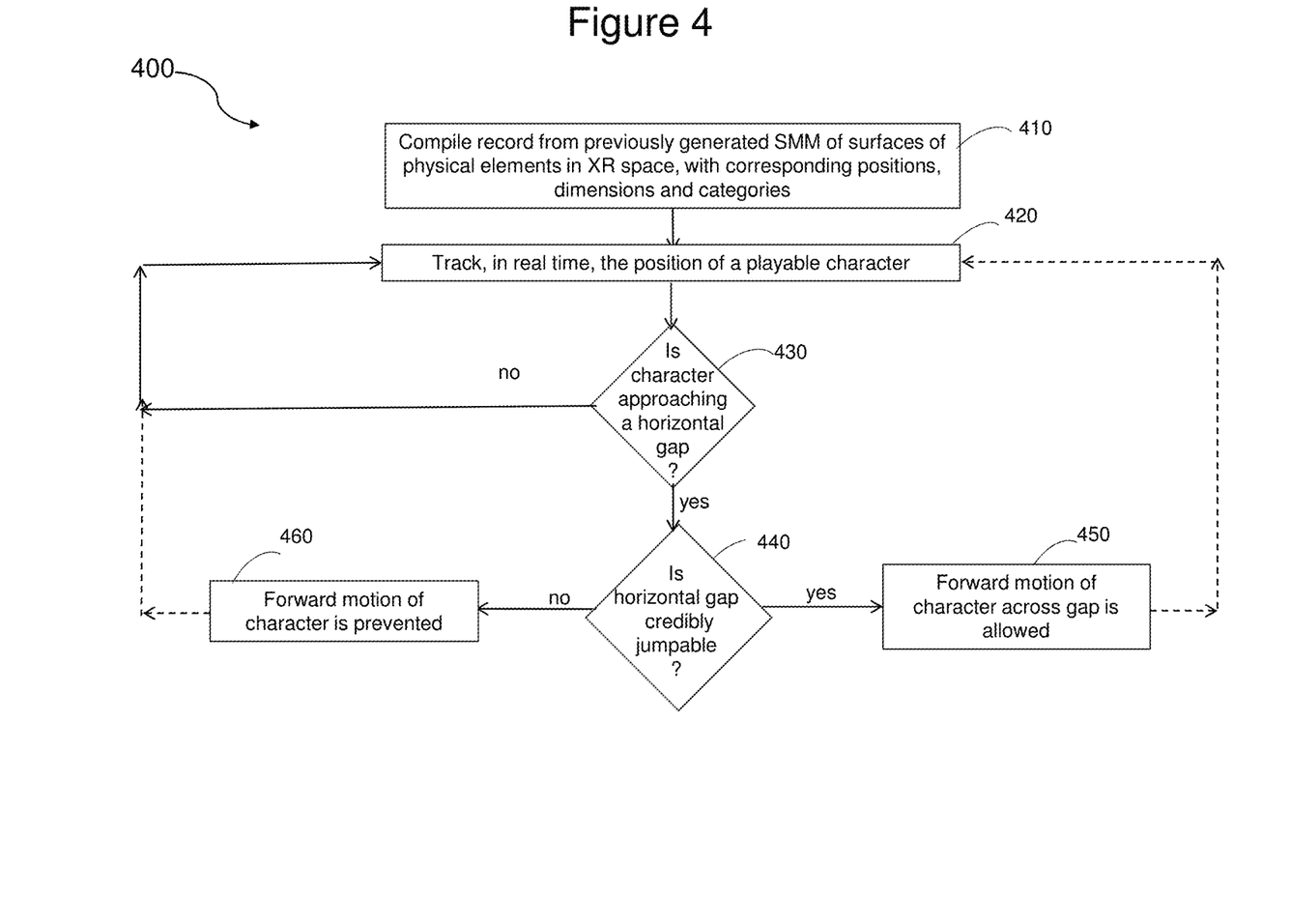
FIG. 4 illustrates examples of XR spaces, in each of which a user-controlled character is seen approaching an edge of one surface, and a decision is made on whether to allow the character to jump across a gap to reach another surface, according to some embodiments.

FIG. 4 is a flowchart that illustrates steps of a method 400 according to various embodiments of the present invention that address the problem of regulating jumps in an XR environment to keep them believable, again making use of an SMM mesh obtained as discussed above.

At step 410, a record is compiled from previously generated SMM of surfaces of physical elements in XR space, with corresponding positions, dimensions and categories. This happens before the game action begins, while steps 220-260 take place during the playing of the game.

At step 420, the position of a playable character is tracked in real time, by maintaining a virtual collider block, sized according to considerations to be discussed in more detail below, in connection with step 440, at a first position relative to the character and the real surface over which the character is currently moving (close to and just in front of the character as in the "falls" embodiments described above).

At step 430, it is determined whether the character is approaching a substantially horizontal gap between the real surface (the first surface) over which they are moving and a second real surface in front of them. "Substantially" should be understood in this context to mean that a simple jump forwards from the first surface could put the character onto the second surface, without involving much if any vertical movement. For example, it may mean that the angle of a line connecting the end points of the jump should be less than +/−20 degrees from the horizontal.

A horizontal gap may be detected in the same way described above regarding vertical gaps by performing a collision analysis involving a virtual collider block, by keeping a back edge of the block a short fixed distance—one or two stride lengths of the character for example—in front of the character while positioned vertically such that a top surface of the block is initially in contact and level with the first surface, keeping that vertical level constant as the character moves horizontally over that surface, and repeatedly checking whether or not the collider block is still making contact with the first surface. As noted above, the details of collision analyses using information in spatial mapping meshes are well known to those of ordinary skill in the art, and will not be discussed further herein.

If at step 430 it is determined that the character is not approaching a gap, method flow loops back to tracking step 420 and repeats until a gap is detected. If and when it is determined that the character is approaching a gap, method flow passes to step 440, where an assessment is made as to whether the gap is "credibly jumpable". This assessment typically depends in part on characteristics of the playable character, such as their perceived height and/or strength. A gap of a given distance may be credibly jumpable for a tall athletic-looking character and not so for a character with a squat, sedentary build, for example. It is assumed herein that the game developer would have specified a particular maximum credible jump distance for the playable character of interest. The width of the virtual collider block 555 is chosen such that as the block moves horizontally forward, tracking the character's forward motion, the front edge of the block is maintained at the maximum credible jump distance in front of the character, Of course, the small gap between the back edge of the block and the character has to be taken into account in determining a suitable width, The assessment at step 440 may be achieved by maintaining the position of the virtual collider block in front of the character with its forward edge at the maximum credible jump distance, as the character continues to move forwards; and performing a collision analysis to check whether any part of the block is in contact with the second surface. If it is, the horizontal gap may be considered credibly jumpable, so method control passes to step 450, at which the character is permitted to move forwards if so driven by the user, to the edge of the first surface and then jump to the second surface. If the collision analysis shows that no part of the virtual collider is in contact with the second surface, the gap is considered to be too large to be credibly jumpable, and method control passes to step 460, where the character is prevented from moving forward. In some cases, the character may make some sort of gesture at this point, like throwing their arms up, or shaking a fist, or something else relevant to the game, making it clear to the user that forward progress has been blocked.

Figure 5:
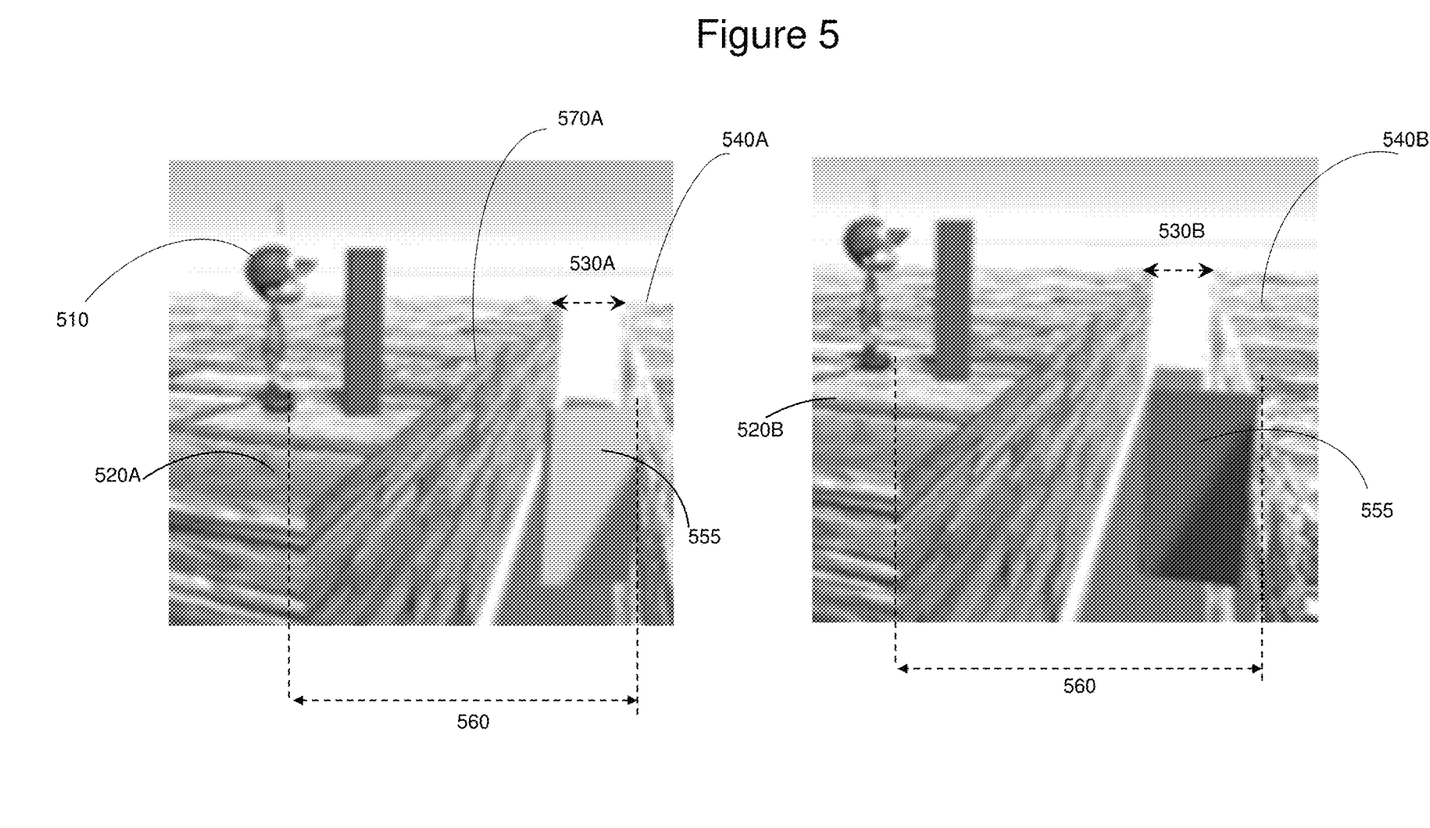
FIG. 5 is a flowchart of steps of a method to regulate jumps according to some embodiments.

FIG. 5 illustrates a perspective view of two XR game scenarios, in which a playable character is seen approaching a substantially horizontal gap, and a decision must be made on whether to allow the character to continue forwards to jump across that gap, according to some embodiments.

In the left hand scenario in the figure, playable character 510 is walking across surface 520A towards a horizontal (or substantially horizontal) gap 530A between 520A and a second surface 540A. The character is preceded by virtual collider block 555[1], at a separation in front of character 510 maintained such that the block's forward edge is at the character's maximum credible jump distance 560. In the pictured scenario, the back edge of the collider block has lost contact with the surface over which the character is moving, showing that the character is approaching edge 570A, while the forward edge of the collider block has still not reached the nearest edge of surface 540A. The result of a collision analysis for collider block 555 and second surface 540A will show no contact, and will be interpreted as meaning that the jump is impractically large. In other words, the answer generated to the question at step 440 of method 400 would be "no" and therefore further movement of the character 510 towards the edge would be prevented. Although gap 530A may appear at first sight to be smaller than the maximum credible jump distance 560, FIG. 5 is a perspective view, and the gap would in actuality be larger than the maximum credible jump distance.

The other collider block present in each scenario in this figure, closer to the playable character, is irrelevant to the "jump" embodiments of interest in this part of the disclosure.

In the right hand scenario in the figure, the same playable character 510 is walking across surface 520B towards a horizontal gap 530B (smaller in reality than gap 530A, the figures not being drawn exactly to scale) between 520B and a second surface 540B. The character is preceded by collider block 555, which, as in the left hand scenario, is not visible to the user. The big difference in this second scenario is that the front edge of block 555, positioned at the maximum credible jump distance 560 from the character as before, is now seen to reach surface 540B. The collision analysis performed during step 440 of method 400 would therefore show that block 555 has lost contact with surface 520B but is in contact with surface 540B. This finding would be interpreted as meaning that gap 530B is small enough to be credibly jumpable for character 310, so the answer generated to the question at step 540 of method 500 would be "yes" and therefore further movement of the character 310A towards the edge would be allowed, and the user would be able to make the character jump across the gap.

It should be noted that the right hand scenario depicts an extreme case of allowability, where the magnitude of the horizontal gap exactly matches the threshold of being credibly jumpable; if the gap even slightly bigger, the block would lose contact with surface 340B, the step 440 answer would be "no" and forward movement of the character would be prevented, as in the left hand scenario discussed above. In many cases of allowability, the virtual collider block might reach beyond the near edge of the second surface, meaning the magnitude of the gap would be smaller than the maximum credible jump distance, so of course the character would be permitted to move forwards closer to edge 570B and jump across the clearly "allowable" gap.

The above embodiments have considered fallable gaps and jumpable gaps separately as distinctly different entities. In some embodiments, both types of virtual colliders may be present, addressing whichever type of gap the character may encounter—vertical or horizontal. In some embodiments, the same basic ideas of tracking characters and assessing relative positioning of characters and nearby surfaces in real time as users move the characters over real surfaces in environments that are not under game developers' control may be applied sequentially or in more integrated ways to deal with gaps that may have significant components in vertical and horizontal planes.

Embodiments of the present invention provide many benefits. In general terms, methods described above allow a user of an XR environment, which may be a room, in the user's home or business premises for example, in which a spatial mapping mesh has been made, to experience a greater sense of immersion in that XR space than would otherwise be likely, by being able to move a character around in ways that are entertaining and engaging but nevertheless subject to at least some of the constraints of "normalcy". Specifically, embodiments provide ways to allow the character to be directed by the user to jump or fall between real surfaces that are close enough together that such movements are credible, but is otherwise blocked from doing so. Games that involve quests and chases are obvious choices to make use of such motion regulation.

Embodiments described above are efficient in their use of computing resources by limiting collision analysis to address surfaces of virtual collider blocks and real objects only in the local vicinity of the moving character, rather than trying to address all surfaces within the XR space. This should keep the processor load to manageably low levels.

As noted earlier, the present invention is not limited to games alone. Shopping and navigation-focused apps are examples of non-gaming applications that may be envisaged.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for regulating falls of a user-controlled virtual character through gaps between surfaces in an extended reality (XR) space in which the user is playing a game; the method comprising:
   compiling a record from a previously generated spatial mapping mesh (SMM) of surfaces of real elements present in the XR space, with corresponding positions and dimensions; and
   after the game begins, determining whether, if the virtual character approaches a substantially vertical gap between an edge of a first surface at a first level and a second surface, at a second level lower than the first level, continuing motion of the virtual character to fall through the vertical gap will be permitted or prevented.

2. The method of claim 1, wherein the determining comprises:
   tracking a position and forward facing direction of the virtual character in relation to a first surface over which the virtual character is moving by maintaining a virtual collider block at a short distance in front of the virtual character as the virtual character moves forwards; and
   carrying out a collision analysis process involving the virtual collider block and the first and second surfaces.

3. The method of claim 2,
   wherein the virtual collider block has a height greater than a maximum credible fall height; and
   wherein a top surface of the virtual collider block is positioned vertically at or above the first surface such that a bottom surface of the virtual collider block extends below the first level by the maximum credible fall height.

4. The method of claim 3, wherein the collision analysis process comprises discovering whether the virtual collider block is in contact with the first surface and whether the bottom surface of the virtual collider block is in contact with the second surface, such that:
   if the virtual collider block is found not to be in contact with either the first surface or the second surface, the character will be prevented from moving forwards; and
   if the virtual collider block is determined to have lost contact with the first surface and is determined to be in contact with the second surface, the virtual character will be permitted to move forwards and fall off the edge to land on the second surface.

5. The method of claim 3, wherein the maximum credible fall height is determined at least in part by a physical feature of the virtual character.

6. The method of claim 5, wherein the physical feature is a height of the virtual character.

7. A method for regulating jumps of a user-controlled virtual character across gaps between surfaces in an extended reality (XR) space in which the user is playing a game; the method comprising:
   compiling a record from a previously generated spatial mapping mesh (SMM) of surfaces of real elements present in the XR space, with corresponding positions and dimensions; and
   after the game begins, determining whether, if the virtual character approaches a substantially horizontal gap between an edge of a first surface at a first level and a second surface, continuing motion of the virtual character to jump across the horizontal gap will be permitted or prevented.

8. The method of claim 7, wherein the determining comprises:
tracking, as the virtual character moves forwards, a position and forward facing direction of the virtual character in relation to a first surface over which the virtual character is moving, by maintaining a virtual collider block having a forward edge at a maximum credible jump distance in front of the virtual character; and
carrying out a collision analysis process involving the virtual collider block and the first and second surfaces.

9. The method of claim 8, wherein a top surface of the virtual collider block is positioned vertically at the first level.

10. The method of claim 8, wherein the maximum credible jump distance is determined at least in part by a physical feature of the virtual character.

11. The method of claim 10, wherein the physical feature is a height of the virtual character.

12. A system for regulating falls of a user-controlled virtual character through gaps between surfaces in an extended reality (XR) space in which the user is playing a game, the system comprising:
one or more processors; and
logic encoded in one or more non-transitory media for execution by the one or more processors and when executed operable to:
compile a record from a previously generated spatial mapping mesh (SMM) of surfaces of real elements present in the XR space, with corresponding positions and dimensions; and
after the game begins, determine whether, if the virtual character approaches a substantially vertical gap between an edge of a first surface at a first level and a second surface at a second level lower than the first level, continuing motion of the virtual character to fall through the vertical gap will be permitted or prevented.

13. The system of claim 12, wherein the determining comprises:
tracking a position and forward facing direction of the virtual character in relation to a first surface over which the virtual character is moving by maintaining a virtual collider block at a short distance in front of the virtual character as the virtual character moves forwards; and
carrying out a collision analysis process involving the virtual collider block and the first and second surfaces.

14. The system of claim 13,
wherein the virtual collider block has a height greater than a maximum credible fall height; and
wherein a top surface of the virtual collider block is positioned vertically at or above the first surface such that a bottom surface of the virtual collider block extends below the first level by the maximum credible fall height.

15. The system of claim 13, wherein the collision analysis process comprises discovering whether the virtual collider block is in contact with the first surface and whether the bottom surface of the virtual collider block is in contact with the second surface, such that:
if the virtual collider block is found not to be in contact with either the first surface or the second surface, the character will be prevented from moving forwards; and
if the virtual collider block is determined to have lost contact with the first surface and is determined to be in contact with the second surface, the virtual character will be permitted to move forwards and fall off the edge to land on the second surface.

16. The system of claim 14, wherein the maximum credible fall height is determined at least in part by a physical feature of the virtual character.

17. The system of claim 16, wherein the physical feature is a height of the virtual character.

* * * * *